United States Patent [19]
Holt

[11] 4,026,512
[45] May 31, 1977

[54] STATIC MOLD VENT

[76] Inventor: Kenneth Holt, 9700 Norlain, Downey, Calif. 90240

[22] Filed: July 28, 1975

[21] Appl. No.: 599,699

[52] U.S. Cl. .................................. 249/141; 138/40; 138/42; 220/303; 220/367; 425/812

[51] Int. Cl.² .................. B29C 1/14; F15D 1/00; B65D 51/16

[58] Field of Search ........ 249/141, 66 A; 425/812, 425/DIG. 60, 405, 178, 440, 146, 420; 164/305, 410; 138/37, 40, 42, 43, 45, 46, 44; 220/303, 366, 367, 373; 159/2 E

[56] References Cited

UNITED STATES PATENTS

| | | | |
|---|---|---|---|
| 1,522,780 | 1/1925 | Hennessy | 425/28 |
| 1,875,660 | 9/1932 | Rodin | 425/178 |
| 1,919,408 | 7/1933 | Work | 138/40 |
| 2,004,652 | 6/1935 | Dempsey | 425/812 X |
| 2,682,952 | 7/1954 | Griffin | 138/42 X |
| 2,752,635 | 7/1956 | Miller | 249/141 |
| 2,933,102 | 4/1960 | Hillman | 220/367 X |
| 3,072,261 | 1/1963 | Smith | 138/42 X |
| 3,302,664 | 2/1967 | Plamann | 220/366 X |
| 3,344,477 | 10/1967 | Stokis | 425/812 X |
| 3,374,983 | 3/1968 | Garretson | 425/812 X |
| 3,377,662 | 4/1968 | Fukushima | 425/812 X |
| 3,517,700 | 6/1970 | Williams | 138/44 |
| 3,712,780 | 1/1973 | Jope | 425/812 X |

*Primary Examiner*—Ronald J. Shore
*Assistant Examiner*—John S. Brown
*Attorney, Agent, or Firm*—Georges A. Maxwell

[57] ABSTRACT

A static mold vent comprising a bore extending through a mold wall with a cylindrical inner portion opening at a cavity surface in the mold and a threaded outer portion opening at an exterior surface of the mold, a plug with a threaded outer portion engaged in the threaded portion of the bore and cylindrical inner portion projecting inwardly through the inner portion of the bore and cooperating therewith to define an air conducting annulus opening at said cavity surface, air bleed means in the plug communicating between the outer end thereof and the outer end of the annulus and tool engaging means engageable at the rear end of the plugs.

9 Claims, 11 Drawing Figures

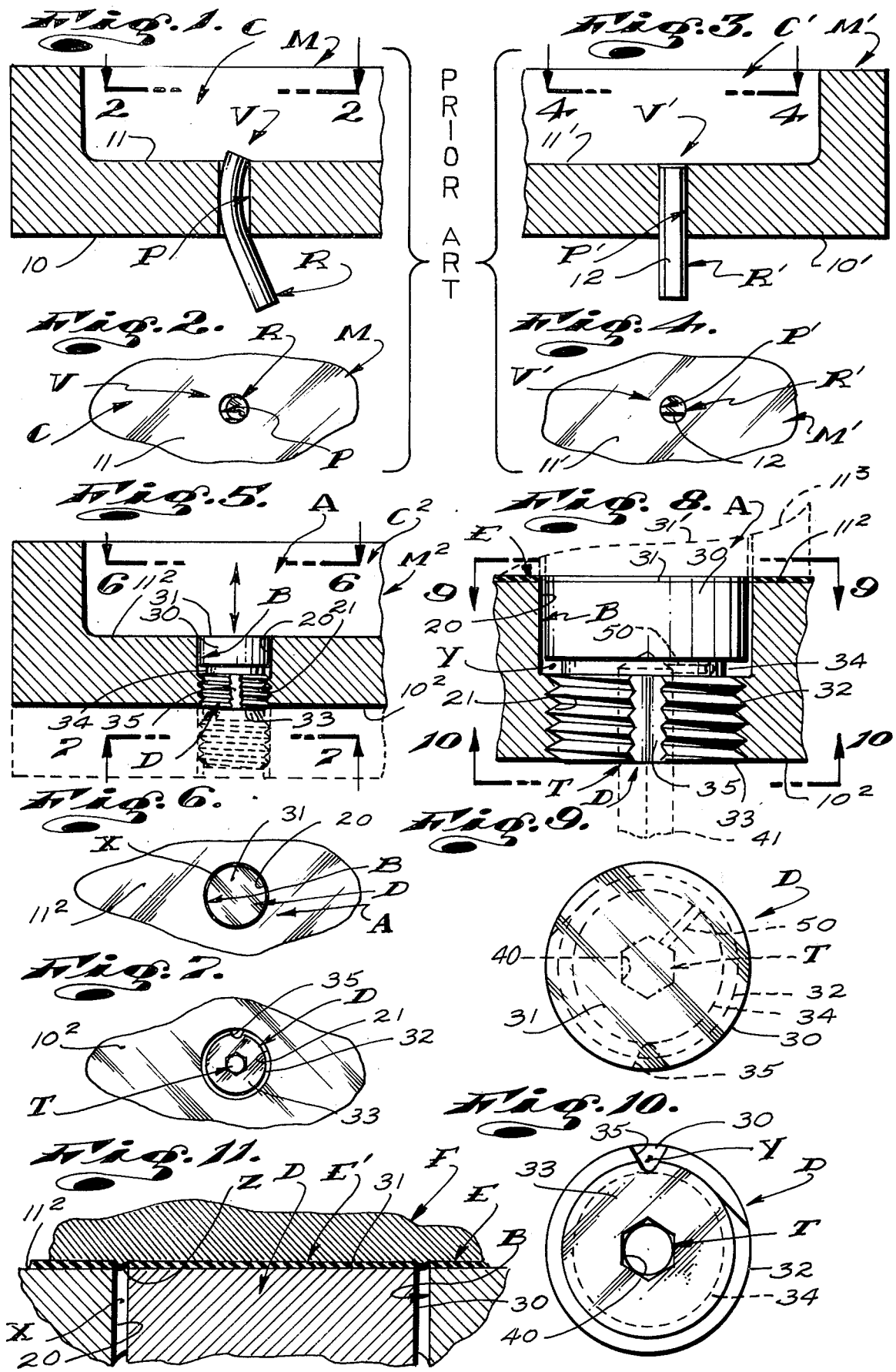

STATIC MOLD VENT

This invention has to do with a mold vent and is particularly concerned with an improved vent structure for arrangement in a static or permanent metal forming mold to effectively vent air and gases displaced from within the mold by in-flowing molten metal.

It is well-known that in an overwhelming number of instances, metal forming molds must be provided with vents to permit the air within the molds to escape therefrom when displaced by in-flowing molten metal and that such vent means or vents must be strategically located within and about the molds so as to prevent the trapping of air pockets within the molds and which would result in imperfections in the resulting castings.

To the above end, the prior art has developed two basic and most commonly employed vent means or structures. One of those prior art structures comprises a bore or opening drilled through the wall of the mold to communicate with the mold cavity and the exterior of the mold and an elongate cylindrical pin or rod, less in diametric extent than the bore and having a bent inner end portion which is pressed into tight biased engagement in and through the bore whereby the rod is tightly engaged in the bore. The rod has an elongate outer portion projecting from the exterior surface of the mold to serve as a handle or means by which the rod can be engaged in and removed from the mold, as circumstances require. The rod in such vent means cooperates with the inner end of the bore to define an air passage with a crescent shaped dinner open end, the maximum width of which is sufficiently small so that the molten metal, by virtue of the surface tension of the metal, will not readily enter the opening and flow into and plug the bore, about the portion of the rod therein.

The other or second common form of vent means provided by prior art includes a bore similar to the bore in the first above noted prior art vent means and includes an elongate rod with an inner end portion which is press-fitted in the bore and an outer end portion or handle which provides means for engagment and removal of the rod in and from the bore, as in the case of the first noted vent means. The rod in the second form of vent means is provided with a longitudinally extending flat at one side which flat cooperates with the bore to provide a longitudinally extending air passage through the bore and along the rod of segmental cross-section, the major width of which, like the crescent opening in the first noted prior art structure, is such that molten metal is not likely to enter and/or flow therethrough.

In the case of each of the noted prior art vent structures, there is a tendency for the rods to work and shift longitudinally in the bores, during use of the molds, with resulting adverse effects. Further, it is oftentimes necessary that the inner ends of the rods be formed and dressed to conform to the configuration of the adjacent cavity surfaces of the molds. It is extremely difficult and takes great care and skill to effectively so form and dress the inner ends of rods which are held in their bores as a result of their biased or pressed engagement therein as the rods are subject to rotating and shifting axially in and relative to their bores when so worked upon.

In the course of using static or permanent molds, it is necessary to service and clean the molds periodically and it is common practice and necessary to paint the cavity surfaces thereof with a paint which serves as a releasing agent and to insulate between the cavity surfaces and the molten metal. The mold paint is commonly applied to the cavity surfaces in varying thickness to control the rate of heat exchange between the mold body and the molten metal and to thereby control the location and the rate of chilling and resulting setting up of the molten metal. Such practice is required to assure the proper complete and uniform flow of metal into and throughout the mold. It is as important that the inner end surfaces of the rods of the vent means be cleaned and painted as it is that the cavity surfaces be so painted.

To effect cleaning and painting of molds with those vent means provided by the prior art, it is necessary that the cavity surfaces and end surfaces of the vent rods be cleaned and then painted. Since the paint readily flows into the vent bores and about the vent rods, the rods must be removed and their sides carefully cleaned of paint. Further, the bores must be cleaned of paint. Following such cleaning, the rods must be carefully re-engaged and accurately oriented in the bores.

The above practice is time consuming, requires great and special skill and the results are oftentimesless than desired, since the vent rods are oftentimes improperly oriented and result in the establishment of surface teats, dimples, or other similar irregularities in the molded parts.

In the case of the prior art forms of vent means described above, the amount of venting afforded thereby is limited and oftentimes undesirably restricted. Further, the inner surfaces thereof are of limited area and are oftentimes difficult to effectively paint.

It is an object of my invention to provide a novel static mold vent structure which establishes a large diameter annular air passage opening at the cavity surface of the mold and provides an air passage of materially greater cross-sectional area and which is narrower than is possible or practical to establish with the common mold vent structure provided by the prior art, having comparable flow capacity.

It is another object and feature of this invention to provide a mold vent structure having a plug element of greater diametric extent than the rods employed in the common prior art vent means whereby an inner cavity surface of greater area is presented than is presented by the prior art rods and on which mold paints can be more effectively and securely deposited.

Still another object and feature of the present invention is to provide a mold vent structure of the general character referred to including a plug element which is threadedly engaged in a bore in the mold body and is such that it can be easily, quietly and effectively, repeatedly removed and re-engaged in and with the mold in exact predetermined orientation therewith, without exercise of great or special skill.

It is an object of this invention to provide a mold vent structure of the character referred to which is such that the plug element or member is screwed into fixed position in the bore in the mold so that the inner end portion thereof can be most conveniently and effectively formed and dressed to conform to the configuration of the cavity surface of the mold.

Another object and feature of the invention is to provide means of the character referred to above wherein the bore and the plug member are of sufficiently large diameter that the effective cleaning and trimming of paint which is applied thereto, following cleaning of the mold, is made both easy and convenient.

Finally, it is an object of my invention to provide a mold vent structure of the character referred to which, while more costly to establish, effects a material saving in the time required to clean and service mold than is the case with prior art vent means, with resulting substantial economic savings.

The foregoing and other objects and features of my invention will be apparent and will be fully understood from the following detailed description of one typical preferred form and application of my invention, throughout which description reference is made to the accompanying drawings, in which:

FIG. 1 is a cross-sectional view showing one prior art form of vent means;

FIG. 2 is a plane view of the vent structure shown in FIG. 1 and taken as indicated by line 2—2 on FIG. 1;

FIG. 3 is a cross-sectional view showing another prior art form of vent means;

FIG. 4 is a plane view of the structure shown in FIG. 3 and taken as indicated by line 4—4 on FIG. 3;

FIG. 5 is a sectional view of the vent means provided by the present invention;

FIG. 6 is a plane view taken as indicated by line 6—6 on FIG. 5;

FIG. 7 is a plane view taken as indicated by line 7—7 on FIG. 5;

FIG. 8 is an enlarged detailed sectional view of the vent structure shown on FIG. 5;

FIG. 9 is a plane view of the inner end of the vent plug, taken as indicated by line 9—9 on FIG. 8;

FIG. 10 is a plane view of the outer end of the vent plug, taken as indicated by line 10—10 on FIG. 8; and FIG. 11 is an enlarged sectional view of a portion of my vent structure.

Referring to FIGS. 1 through 4 of the drawings, I have shown the two most common forms of static mold vents employed by the prior art. The prior art form of vent shown in FIGS. 1 and 2 of the drawings can best be described as the "bend rod" form of vent and the form of vent shown in FIGS. 3 and 4 of the drawings can best be described as the "relieved rod" form of vent.

In both forms of prior art vents herein disclosed, the vent structures V and V' are characterized by straight, cylindrical ports P and P' established through the bodies of the molds M and M' with outer ends opening at the back surfaces 10 and 10' of the mold bodies and with inner ends opening at surfaces 11 and 11' of the mold cavities C and C'.

In addition to the above, the prior art vent means V and V' include rods R and R' engageable in and through the ports P and P' to act and/or serve as metering-valve-like parts. The rods R and R' are intended to cooperate with the ports P and P' to permit air within the mold cavities C and C' to flow outwardly through the ports and about the rods when that air is displaced by molten metal introduced into the cavities and which present openings at the surfaces 11 and 11' of the mold cavities which are sufficiently small in lateral extent than the metal, by virtue of its surface tension, will not flow into or enter the ports, but rather, will bridge the openings defined by the inner ends of the ports and plugs.

In the case of the bent rod form of vent means V, shown in FIGS. 1 and 2 of the drawings, the rod R is smaller in outside diameter than the diameter of the port P, greater in longitudinal extent than the port and has an inner end portion adapted to be engaged in and through the port P. That portion is bent so that it establishes tight binding engagement in the port and tends to remain in fixed or set position in said port, upon being forced and urged into engagement therein. In this form of the invention, the degree of security with which the rods R are secured in the ports P is wholly dependent upon the resiliency and the mass of the rods R and is materially restricted or limited by the fact that they cannot be so heavy and stiff as would impede their engagement in the ports by manual force or result in adverse scuffing, scarring and/or deformation of either or both the molds and the rods. The rods R have outer free end portions, projecting freely from the backs of the molds and adapted to be engaged by suitable hand tools, such as pliers, hammers and the like, to assist engagement and to effect orientation or removal of the rods in and from the ports.

In the case of the relieved rod form of vent means V' shown in FIGS. 3 and 4 of the drawings, the rod R' is an elongate straight part substantially equal in outside diameter with the diameter of the port P' and such that it can be manually urged into and through the port P', in press fit, by manually applied force. The rod R' is characterized by a relieved side established by a longitudinal flat 12 established by a suitable grinding or machinery operation.

The rod R' has an inner portion engaged in and through the port P' and an outer hand tool engaging outer portion projecting freely from the back of the mold M'.

The relief flat 12 on the rod R' cooperates with the bore of the port P' to establish a segmental vent passage through which air in the cavity C', displaced by molten metal, can escape, but which is small enough so that the molten metal, by virtue of its surface tension will not enter it.

In both forms of prior art, vent means V and V' set forth above, the cross-section configuration of the vent passages, at the cavity surface and defined by the ports and rods is not uniform, one being crescent shaped and the other being segmental. In both instances, the effective cross-section of the vent passage is limited by virtue of the cross-sectional shape of the passages and the major allowable lateral extent of the passages whereby entry and flow of molten metal therein is prevented.

As indicated in FIG. 1 of the drawings, the inner end of the bent rod in the first noted form of vent V is commonly out of alignment and/or on a different plane than the related surface of the mold cavity and must be machined and/or dressed, while in place in the cavity, if a clean casting, free of vent marks is to be produced. Since the rod is not tightly but is yieldingly secure in the port, effective grinding and dressing of the inner end of the rod requires the exercise of great skill and the expenditure of considerable time. Further, if the rod is removed and re-engaged in the port, it is often extremely difficult and time-consuming to properly reorient the dressed end surface with the mold surface.

In the case of both prior art forms of vent means V and V', the cross-section of the ports P and P' and the area of the inner end faces of the rods R and R' is small and such that it is difficult to clean mold paint from within the ports and from the sides of the rods, without disturbing the paint on the end surfaces of the rods (when the molds are painted and the rods are temporarily removed for the purpose of cleaning undesired paint within the ports and about the sides of the rods).

In FIGS. 5 through 11 of the drawings, I have illustrated a vent structure A embodying my invention and related to a mold structure $M^2$ similar to the molds M and M' shown in FIGS. 1 through 4 of the drawings.

The mold $M^2$ is a unit defining a back surface $10^2$, a forwardly opening cavity $C^2$ with or defining an inner mold surface $11^2$. Apart from the above, the mold $M^2$ can vary widely in form and construction without departing from the spirit of my invention. For example, the surface $11^2$ of the cavity $C^2$ might not be flat, as shown, but can be replete with contours and the like, defining ribs, valleys, angularly related surfaces and the like. Further, the body or wall thickness of the mold, as between the surfaces $10^2$ and $11^2$, while commonly about 1 inches thick, is subject to considerable variation.

The vent structure A includes a straight cylindrical bore B extending through the back wall of the mold body, with inner and outer ends opening at the surfaces $10^2$ and $11^2$. The bore B is characterized by a straight, smooth inner portion 20 and an outer portion threaded as at 21. The smooth cylindrical inner threads 21 are cut in portions established by drilling of a counter from the cavity side of the bore B to a predetermined depth or axial extent. The diametric extent of the portion 20 of the bore is preferably equal in diametric extent with the major diametric extent of the threads in the portion 21 of the bore. The threads terminate in the bore B in predetermined spaced relationship from the cavity surface $11^2$ of the mold.

In practice, for example, the bore B can be varied in diametric extent and is preferably sufficiently large in diameter so that access to the interior thereof can be readily and conveniently had for the purpose of cleaning mold, paint and the like from the counter bore or inner cylindrical portion thereof and so that the corner established by the mold surface $11^2$ and the bore can be effectively established and maintained sharp and clean. By making the bore of a size to afford ready access to the interior thereof mold paint on and about the noted corner can be effectively cut and trimmed so as to define a clean sharp corner in the mold about the inner end of the bore.

The ability to establish and maintain a clean sharp corner about the inner end of the bore, as above noted, is highly important in the instant vent structure as the establishment and maintenance of such a corner best and most effectively utilizes the effect of surface tension of the molten metal, relied upon to prevent the flow of metal into the bore when the structure is in use.

The vent means A next includes an elongate cylindrical plug D with a straight cylindrical inner portion 30 having an inner end surface 31, an outer threaded portion 32 with an outer end surface 33, a central or intermediate, radially outwardly opening annular groove 34 and an axially extending, outwardly opening air bleed channel 35 in the outer threaded portion 32 and tool-engaging means T.

The inner portion 30 of the plug D is slightly smaller in diameter than the diameter of the counterbore or inner portion 20 of the bore B and is adapted to normally extend freely through the inner portion of the bore, concentric therewith and cooperates therewith to define an air conducting annulus X of predetermined radial extent, that is, of predetermined width. In practice, the annulus X is preferably about 0.003 inches in radial extent or width and such that molten metal introduced into the mold under those pressures normally encountered in pressure fed molds will not enter and flow into the annulus.

In the case of gravity fed molds, the annulus could be as much as 0.007 inches in radial extent or width without adverse effects.

The axial extent of the inner end portion 30 of the plug is preferably substantially equal to the axial extent of the inner portion 20 of the bore B and such that when the inner portion of the plug is fully engaged in the bore to engage and stop against the inner end of the thread in the bore, the inner end face 31 of the plug is flush with the surface $11^2$ of the cavity C in the mold, as clearly illustrated in the drawings.

The threads or the outer portion 32 of the plug and threads of the outer portion of the bore 21 cooperate to establish a snug fit, whereby the plug can be threadedly advanced in the bore to any desired axial position therein and is retained in that position by virtue of the fit of the threads. Such retension is sufficiently secure to hold the plug in place in normal operation and use of the mold. Accordingly, while it is preferred that the inner portion 31 of the plug stop on the thread in the bore to position the plug axially in the bore, such positioning of the plug is not essential.

The channel 35 in the outer portion of the plug is established in the plug by a suitable machining or grinding operation and is prefenably about 0.02 inches greater in depth than the threads on the plug to assure a free air passage longitudinally of the threads 21 and 32 when the plug is engaged in the bore.

The annular central groove 34 cooperates with the adjacent inner and outer portions of the plug and with the adjacent inner and/or outer portions of the bore to define an annular air conducting chamber Y communicating with the lower end of the annulus X and with the outer end of the channel 35 and assures free flow of air through the annulus, about the lower end thereof, into, through and thence out of the channel 35.

The vent A next includes the means T which is shown as including a central polygonal recess 40 entering the outer surface 32 of the plug and in which an Allen wrench or the like can be engaged to screw or advance the plug into and out of engagement in the bore, as desired, or as circumstances require.

Alternatively, the means T can include an elongage manually or tool-engageable stem fixed with and projecting longitudinally outward from the center of the end 33 of the plug and as illustrated at 41 in dotted lines in FIG. 8 of the drawings. The stem 40 can be in the form of a simple Allen wrench fixed in the socket 40 or can be of any other special form circumstances might dictate or which might simplify use of the structure.

In practice, and as illustrated in dotted lines in FIG. 8 of the drawings, where and/or when the cavity surface $11^3$ of the mold adjacent the bore B is contoured or is other than flat and normal to the axis of the bore, a special plug with an inner end surface 31' which conforms to the portion of the surface 11' adjacent to the bore is provided. In practice, when a special contoured plug is established, a simple or plain plug with an inner portion greater in longitudinal extent than the inner portion of the bore is fully engaged in the bore to that position where its inner portion stops on the threads in the bore. When the special plug is thus engaged and set in the bore, the inner end portion of the plug projecting from the bore is machined, ground or otherwise dressed to establish the inner end surface 31', which corresponds in configuration with the portion of the surface $11^3$ adjacent to it and so the surfaces $11^3$ and 31' are flush with each other or fare one into and/or with the other (whereby the cavity surface is substantially uninterrupted except for the upper open end of the annulus).

It is important and significant to note that the edge or corner established by the inner end surface of the plug and the outside surface of the inner portion of the plug established a sharp clean edge which occurs in close relationship with the related sharp clean inner end edge of the bore and cavity surface, whereby maximum desired effect of surface tensuon of the molten metal to prevent flow of that metal into the annulus X is assured.

It is to be particularly noted that the plug D is of substantial diametric extent and that its inner portion is only sightly less in diameter than the inner portion of the bore B. If the bore B is 1 inches in diameter, the inner portion of the plug is only slightly less than an inch in diameter, for example 0.994 inches in diameter (if the annulus is but 0.003 inches wide).

It will be apparent and readily appreciated that with a relatively large diameter inner portion, such as noted above, an inner end surface 31 of substantial area for easy and effective application of mold paint is provided. Further, a plug of such size and/or dimension is such that when it is necessary to clean mold paint from about the plug during cleaning and servicing of the mold, the mold paint can be most effectively conveniently removed from the side of the plug and can be cleanly and accurately cut and trimmed about the upper edge of the plug to establish a clean, sharp upper inner edge about the annulus X.

With the structure here provided, the area of the inner end surface 31 of the plug D can be made sufficiently large to assure a secure bond between that surface of the plug and mold paint applied thereto and of sufficient extent to enable the desired building up and thickening of the mold paint on the plug to attain the desired insulating effect sought to be attained with the paint.

At this time, it is to be particularly noted that in the previously described prior art forms of vent means, the inner end surfaces of the rods are of little or limited area and such that mold paint, oftentimes cannot be bonded thereon with necessary or desired security and on which such paint often cannot be effectively built up to a desired extent for insulating purposes. Accordingly, it is an object and a significant feature of my invention to provide an improved vent means which affords the establishment of large or extensive surfaces on which mold paint can be effectively bonded and built up in thickness, as desired.

In FIGS. 8 and 11 of the drawings, I have shown mold paint E and E' applied to the surfaces $11^2$ and 31 of the structure in accordance with common practice. In FIG. 11 of the drawings, the reference character F is directed to a mass of molten metal at the inner end of the vent means A and the reference character Z is directed to that portion of the metal F which, by virtue of surface tension of the metal, bridges the inner open end of the annulus X.

With the vent means A here provided, it will be noted that the annulus X is of uniform width, is of substantial circumferential extent, and opens, at its inner end, about a substantial area of the cavity surface of the mold. As a result of the above, the volumetric capacity of the vent means, that is, the amount and rate at which air and gas can be vented therethrough, is great or substantial in comparison with and far exceeding the volumetric capacity of the noted prior art forms of vent means. Such improved flow capacity is attained without forfeiture of the vents capability to prevent the flow or venting of metal from the mold. Further, as a result of the relatively large area of the cavity surface occupied by the vent means, location of the vent means is less critical than is locating of the noted prior art vent means and desired and proper venting of the area of the mold to be vented is far better assured.

It is extremely important to note that upon cleaning the mold of paint, during servicing of the mold, the plug D of the means A can be removed from the bore B, for the purpose of trimming paint from the sides of the plug and from within the bore, by simply unscrewing and advancing the plug inwardly and that once the plug and bore are cleaned, the plug can be simply engaged and screwed back outwardly and into the bore (as by means of a wrench engaged with the outer end of the plug and accessible at the outer side of the mold) and accurately relocated and/or oriented in its predetermined set position. The foregoing operation is simple, quick and does not require the exercise of any special art or skill in its performance.

In the case illustrated, the plug D is engageable into the bore B from the inner end thereof. It is recognized by applicant and it is to be understood that in practice, the inner portions of the bore and plug can be made smaller in diameter than the outer threaded portions thereof and such that the plug can be engaged into the bore from the outer end of the bore, without departing from the spirit of my invention.

Further, in practicing the present invention, if desired, the longitudinal channel 35 can be replaced by a radial port 50 extending from the groove 34 to the socket 40, as shown in dotted lines in FIGS. 8 and 9 of the drawings.

In the case illustrated the axial extent of the bore is limited or short relative to the axial extent of the plug and is such that the plug is substantially coextensive with the bore. In practice, such relative proportioning is not likely to occur. Instead, the bore is most likely to be several times greater in axial extent than the plug, in which case the outer threaded portion of the bore is extended or lengthened. In those cases where the bore is greater in axial extent than the plug, it is possible, practical and oftentimes desirable to advance an Allen lock screw in the outer portion of the bore to engage and lock the plug D in place. Such a relationship and use of a lock screw is shown in phantom lines in FIG. 5 of the drawings.

Having described only one typical preferred form and application of my invention, I do not wish to be limited or restricted to the specific details herein set forth, but wish to reserve to myself any modifications and/or variations that may appear to those skilled in the art to which this invention pertains and which fall within the scope of the following claims:

Having described my invention, I claim:

1. A mold having a mold cavity surface and an outer surface defining a mold wall therebetween, said mold wall having an opening extending through said wall, said opening having a straignt cylindrical inner end portion and a threaded outer end portion, an elongate plug with a threaded outer end portion engaged in the outer portion of the opening and a cylindrical inner portion smaller in diameter than the inner end portion of the opening and arranged concentrically therein and defining an inwardly opening air conducting annulus coextensive with the inner portion of the plug and air bleed means in the plug communicating between the outer ends of the annulus and the plug, said plug defining an inner end face in plane alignment with the plane of the portion of the cavity surface about the annulus and tool engaging means at the outer end of the plug.

2. A mold as set forth in claim 1 wherein the longitudinal extent of the inner portions of the plug and opening are substantially equal.

3. A mold as set forth in claim 1 wherein said air bleed means includes an annular radially outwardly opening groove between the inner and outer end portions of the plug communicating with the outer end of the annulus and an air bleed passage in the plug communicating between said groove and the outer end of the plug.

4. A mold as set forth in claim 2 wherein said air bleed means includes an annular radially outwardly opening groove between the outer and inner portions of the plug communicating with the outer end of the annulus and an air bleed passage communicating between said groove and the outer end of the plug.

5. A mold as set forth in claim 1 wherein said air bleed means include an annular radially outwardly opening groove between the outer and inner portions of the plug communicating with the outer end of the annulus and an axially extending radially outwardly opening channel in the outer portion of the plug and communicating with the groove.

6. A mold as set forth in claim 2 wherein said air bleed means includes an annular radially outwardly opening groove between the outer and inner portions of the plug communicating with the outer end of the annulus and an axially extending radially outwardly opening channel in the outer portion of the plug and communicating with the groove.

7. A mold as set forth in claim 1 wherein said tool engaging means includes an elongate central polygonal wrench engaging socket entering the outer end of the plug.

8. A mold as set forth in claim 1 wherein said tool engaging means includes an elongate central polygonal wrench engaging socket entering the outer end of the plug, said air bleed means including an annular radially outwardly opening groove between the outer and inner portions of the plug communicating with the outer end of the annulus and an axially extending radially outwardly opening channel in the outer portion of the plug and communicating with the groove.

9. A mold as set forth in claim 1 wherein said tool engaging means includes an elongate central polygonal wrench engaging socket entering the outer end of the plug, said air bleed means including an annular radially outwardly opening groove between the outer and inner portions of the plug communicating with the outer end of the annulus and a radially extending port between and communicating with the groove and socket.

* * * * *